(12) United States Patent
Jeffers et al.

(10) Patent No.: US 8,082,750 B2
(45) Date of Patent: Dec. 27, 2011

(54) DEVICE FOR AUTOMATIC PROCESSING OF CONTAMINATED REFRIGERANT FROM AN AIR CONDITIONING SYSTEM

(75) Inventors: Edward Jeffers, Fort Lauderdale, FL (US); Richard Koldewey, Auburn, IN (US); Jose Sacerio, Hialeah, FL (US)

(73) Assignee: CPS Products, Inc., Hialeah, FL (US)

( * ) Notice: Subject to any disclaimer, the term of this patent is extended or adjusted under 35 U.S.C. 154(b) by 198 days.

(21) Appl. No.: 11/689,740

(22) Filed: Mar. 22, 2007

(65) Prior Publication Data

US 2008/0229774 A1 Sep. 25, 2008

(51) Int. Cl.
*F25B 49/00* (2006.01)
*F25B 45/00* (2006.01)
*F25B 43/00* (2006.01)

(52) U.S. Cl. .............. 62/292; 62/149; 62/475

(58) Field of Classification Search ............ 62/292, 62/475, 149
See application file for complete search history.

(56) References Cited

U.S. PATENT DOCUMENTS

| | | | | |
|---|---|---|---|---|
| 4,100,936 A | * | 7/1978 | Turion | 137/596.2 |
| 4,299,251 A | | 11/1981 | Dugas | |
| 4,398,562 A | | 8/1983 | Saarem et al. | |
| 4,480,446 A | * | 11/1984 | Margulefsky et al. | 62/474 |
| 4,628,748 A | * | 12/1986 | Jogan et al. | 73/863.01 |
| 4,809,910 A | * | 3/1989 | Meyer | 239/1 |
| 4,878,517 A | * | 11/1989 | Prange | 137/355.12 |
| 5,099,867 A | | 3/1992 | Emery | |
| 5,222,369 A | * | 6/1993 | Hancock et al. | 62/149 |
| 5,226,454 A | | 7/1993 | Cabalfin | |
| 5,235,821 A | * | 8/1993 | Sevrain et al. | 62/149 |
| 5,367,886 A | * | 11/1994 | Manz et al. | 62/195 |

(Continued)

FOREIGN PATENT DOCUMENTS

JP 2005264959 A * 9/2005

OTHER PUBLICATIONS

Oxford English Dictionary online edition definition of Electromechanical Retreived Dec. 5, 2009 http://dictionary.oed.com/cgi/entry/50295586?single=1&query_type=word&queryword=electromechanical&first=1&max_to_show=10.*

*Primary Examiner* — Judy Swann
*Assistant Examiner* — Alexis Cox
(74) *Attorney, Agent, or Firm* — Malin Haley DiMaggio Bowen & Lhota, P.A.

(57) ABSTRACT

A device for automatic processing of contaminated refrigerant from an air conditioning system, said device comprising a compressor for compressing refrigerant. Said device further comprising an oil separator, said oil separator receiving compressed refrigerant from said compressor; said oil separator further including means for draining oil separated from said compressed refrigerant. Said device further comprising a storage tank, said storage tank receiving and temporarily containing said compressed refrigerant from said oil separator. Said storage tank including a vapor port and a liquid port. Said device further comprising a vacuum pump for creating low pressure within said device during evacuation of refrigerant. Said device further comprising a low pressure service hose for connecting said device to said air conditioning system. Said device further comprising a high pressure service hose for connecting said device to said air conditioning system. Said device further comprising at least one automatic multi-position ball valve. Said at least one automatic multi-position ball valve controlling flow of said refrigerant through said device.

21 Claims, 4 Drawing Sheets

U.S. PATENT DOCUMENTS

| | | | |
|---|---|---|---|
| 5,377,499 A * | 1/1995 | Zugibe | 62/195 |
| 5,479,788 A | 1/1996 | Roegner | |
| 5,493,869 A * | 2/1996 | Shirley et al. | 62/149 |
| 5,606,862 A * | 3/1997 | Peckjian et al. | 62/77 |
| 5,875,638 A | 3/1999 | Tinsler | |
| 5,893,393 A * | 4/1999 | Erdkamp et al. | 137/625.47 |
| 6,371,440 B1 | 4/2002 | Genga et al. | |
| 6,779,350 B2 | 8/2004 | Ramachandran et al. | |
| 6,832,491 B2 | 12/2004 | Ramachandran et al. | |
| 6,843,070 B1 | 1/2005 | Suharno | |
| 7,493,773 B2 * | 2/2009 | Beatenbough et al. | 62/149 |
| 2006/0070672 A1 | 4/2006 | Martins et al. | |
| 2009/0107164 A1 * | 4/2009 | Colnaghi et al. | 62/292 |
| 2009/0158756 A1 * | 6/2009 | Brown et al. | 62/77 |

* cited by examiner

DEVICE FOR AUTOMATIC PROCESSING OF CONTAMINATED REFRIGERANT FROM AN AIR CONDITIONING SYSTEM

BACKGROUND OF THE INVENTION

1. Field of the Invention

The device relates to equipment used for air conditioning refrigerant recovery, recycling, evacuation, and/or recharge with particular use on commercial and automotive refrigerant containing systems.

2. Description of Related Art

Refrigerant Recovery, Recycling, Evacuation, and/or Recharge equipment (commonly referred to as R/R/R Equipment) is designed for use on Commercial and Automotive Refrigerant containing systems. Since it is illegal to vent CFC, HCFC and HFC refrigerants into the atmosphere, equipment has been developed to recover, extract, recycle, evacuate, flush, and/or recharge refrigerants such as R-12, R-22, R-134a and R-410a. The equipment comes in many forms.

R/R/R Equipment has been designed around components such as solenoid valves, check valves, compressors, vacuum pumps, oil separators, and filtration devices. The refrigerant flow through these devices are controlled by electro-mechanical or electronic controls. The following is a brief description on how these components are used in the R/R/R Equipment. Electro-Magnetic Solenoid valves are the current valve of choice to control the flow on R/R/R Equipment. Manufacturers add check valves (to prevent back flow), filters, and other preventive devices to protect solenoid valves used in their equipment.

The solenoid valves (SV) are designed with a small orifice, stem, tightly fitting plunger/core, and electrical coil. The small orifice in the SV is required to meet activation and non-activation pressure differential requirements. The tight spacing between the stem, coil and plunger/core are required for proper electro-magnetic operation. SV's are placed within the R/R/R Equipment plumbing circuit for the desired operation of each mode. This allows for flow control between recovery, recycle, evacuation, flush and/or recharge modes.

The physical design of a typical SV currently used in R/R/R Equipment incorporates a small orifice, plunge/core, spring, shell and electrical inductive coil. The smaller the orifice, the greater the holding power of the solenoid valve plunger/core. If the orifice diameter is too big, the plunger/core spring will not be strong enough to prevent back flow. Also note the electro-magnetic field may not be strong enough to open the plunger/core to the open position due to the differential operation pressures. The direct effect of the small orifice of the SV on the R/R/R Equipment is reduced flow rates during all operational modes.

Other problems associated with the SV are due to the presence of contaminants such as refrigerant system sealers, metal filings, chemical additives, oil, air, and moisture. Metal filings and other particles can lodge and jam between the tight space between the plunger/core and stem assembly making the SV inoperable. Refrigerant scaler, on the other hand, is in the liquid form until air/moisture makes direct contact with it. When the sealer activates, it will harden into a solid form. If the hardening takes place in the stem and plunger/core area, the SV will become inoperable. Excessive oil or liquid in the solenoid stem on the back side of the plunger can cause a delay or even prevent activation. This is called hydraulic lock. Another problem with the SV is that any contaminates on the surface of the orifice will cause the SV to not properly seal. The lack of the seal will cause internal leakage which will lead to overcharging, incomplete recovery, and loss of vacuum.

Compressors (CMP) are used to create a pressure differential during the recovery, recycling, flush and/or recharge operation. The CMP will suck refrigerant from one vessel and compress it into another vessel.

Vacuum Pumps (VP) are used to create a very low pressure area in a vessel during the evacuation mode. This is needed to remove (boil) any existing contaminates such as moisture and/or air before recharging. The presence of air and moisture will cause a refrigeration system to prematurely fail.

Oil separators and other filtration devices are placed in the R/R/R equipment plumbing circuit to meet recycling requirements.

Several attempts have been made to improve Refrigerant Recovery technology. For example, U.S. Pat. No. 5,479,788 issued to Roegner on Jan. 2, 1996 entitled "Refrigerant Recovery System" teaches a new refrigerant recovery system, but does not contemplate the recycling and evacuation of the refrigerant. The '788 patent contemplates the use of a ball valve for regulating flow of refrigerant as well as flare ball valves for service hoses, which are commonly found on solely recovery units. The '788 patent contemplates tank shut off ball valves that are required to disconnect a tank from the system. All of the ball valves in the '788 patent are only two-way valves.

U.S. Pat. No. 6,832,491 issued to Ramachandran et al. on Dec. 21, 2004 entitled "Compressor, Head, Internal Discriminator, External Discriminator, and Manifold Design for Refrigerant Recovery Apparatus" teaches the use of ball valves on the suction and discharge of a cylinder head in the recovery of refrigerant liquid and/or vapor. U.S. Pat. No. 6,779,350 issued to Ramachandran et al. on Aug. 24, 2004 entitled "Compressor Head, Internal Discriminator, External Discriminator, Manifold Design for Refrigerant Recovery Apparatus and Vacuum Sensor" teaches the same technology as the '491 patent. However, the type of ball valve contemplated by the '491 patent and '350 patent is a ball/spring valve, not a rotational ball valve. The spring holds a ball against a seat. When certain conditions occur, the ball will push against the spring allowing flow through. The ball is completely solid and has no holes. This structure is distinctly different from a rotational ball valve.

U.S. Pat. No. 6,371,440 issued to Genga et al. on Apr. 16, 2002 entitled "Electronic Motorized Zone Valve" teaches a valve actuator including a motor for changing the position of a valve, a switch for switching power to the motor, and a sensor for detecting the arrival of the valve at a desired position and for stopping the motor without using a mechanical stop. The ball valve contemplated in the '440 patent is for a two way ball valve which uses only one optical valve switch to estimate the valve position.

U.S. Pat. No. 5,875,638 issued to Tinsler on Mar. 2, 1999 entitled "Refrigerant Recovery System" teaches a system of refrigerant recovery very similar to that described in the '788 patent. The '638 patent is a refrigerant recovery only unit. The '638 patent contemplates the use of ball valves to connect hoses to removable tanks, manifolds, or the valves located on the removable tank. The '638 patent contemplates the use of solenoid valves for its normal operation. All of the valves mentioned in the '638 patent are two way valves.

U.S. Pat. No. 4,398,562 issued to Saarem et al. on Aug. 16, 1983 entitled "Motorized Diverter Valve" teaches a motor driven valve that diverts fluid flow from a single inlet port to either one of two outlet ports, or vice versa. The '562 patent teaches a three way valve that uses mechanical means to determine its position through Cams and micro-switches.

U.S. Pat. No. 5,099,867 issued to Emery on Mar. 31, 1992 entitled "Sealed Valve and Control Means Therefore" teaches a ball valve rotated by a spindle connected to a disc. The '867 patent covers a 2 way valve using magnetic pulse to determine the position. When the valve is moved, pulses are created.

U.S. Pat. No. 5,226,454 issued to Cabalfin on Jul. 13, 1993 entitled "DC Motor Actuated Flow Diversion Valve" teaches a three way valve using a DC motor, cam and micro switches to determine the position.

U.S. Pat. No. 4,299,251 issued to Dugas on Nov. 10, 1981 entitled "Optical Valve Position Sensing" teaches an apparatus for indicating the position of a rotary valve. The '251 patent covers a three light source light reflecting sensor to determine position of a valve. The light is reflected by mirrors to determine the position of the valve.

U.S. Pat. No. 6,843,070 issued to Suharno on Jan. 18, 2005 entitled "Refrigerant Recycling System With Single Ball Valve" teaches a system with a single manual ball valve can be used to connect a common port to either high or low service hoses. The flow through the system is controlled by solenoid valves.

U.S. Patent Application 2006/0070672 filed by Martins et al. entitled "Control Valve for an Engine Cooling Circuit" teaches a structure of a control valve for fluid circulation.

The desire remains for an automatic refrigerant recovery, recycler, recharging or evacuation equipment for the mobile air conditioning market.

SUMMARY OF THE INVENTION

It is contemplated that the present patent application will address a solution to the above stated problems by using ball valves in conjunction with R/R/R Equipment. Said ball valves are automatically operated by electromechanical controls.

In accordance with these and other objects which will become apparent hereinafter, the instant invention will now be described with particular reference to the accompanying drawings.

DETAILED DESCRIPTION

The subject matter in the present application pertains to the use of automatic motorized ball valves used in automatic automotive refrigerant recovery, recycling, and recharging or evacuation equipment for the mobile air conditioning markets. The ball valves are not on/off valves, but are control valves.

Figure 1:
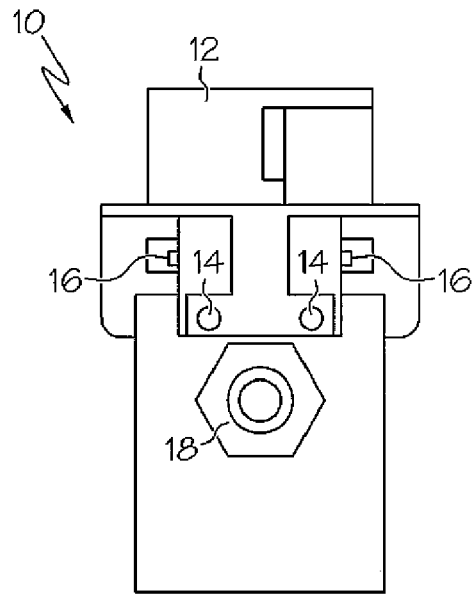
FIG. 1 shows an automatic motorized ball valve in plan view as viewed from the front.

With reference to FIG. 1, an automatic motorized ball valve 10 is shown in plan view as viewed from the front. The ball valve 10 has a motor 12 which turns a handle or ball position wheel 16. It is contemplated that the motor may be a high torque 12 volt direct current motor, however it is contemplated that alternative motors may be effective. A ball valve 10 is opened by turning the ball position wheel 16 attached to stem 50 which is engaged to a ball 13 inside the valve. The position of the handle 16 is determined by a position system 14. It is contemplated that the position system 14 is exacted through two optical sensors. The optical sensors use direct transmissive infrared signals each aimed toward a sensing device that will produce a digital signal of open or closed. The infrared signals must pass through two position holes in order to produce a digital signal of open. Further shown is one of two apertures 18 located on either side of the valve 10. Each aperture 18 provides an opening for either end of a central flow canal. The ball 13 is contained within the canal. The ball 13 has a hole, or port, through the middle so that when the port is in line with both ends of the valve, flow of refrigerant is permitted. When the valve is closed, the hole is perpendicular to the ends of the valve, and flow is blocked. The handle position allows you to view the valve's position. The body of ball valves may be made of metal, ceramic, or plastic. The ball valve 10 is a three-way valve, as it is commonly called in the marketplace. Three-way ball valves have an L- or T-shaped hole through the middle.

Figure 2:
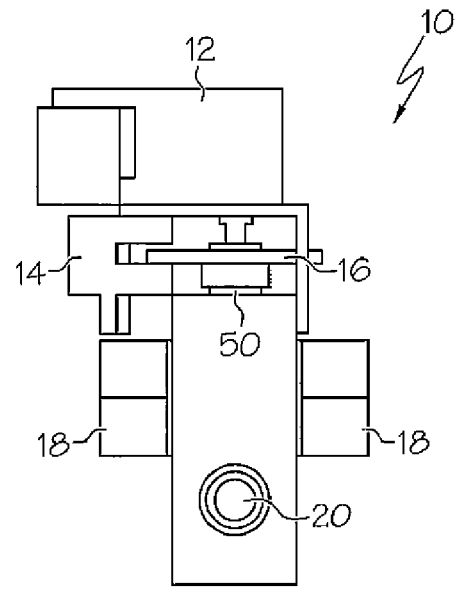
FIG. 2 shows a ball valve in plan view from the side.

With reference to FIG. 2, the ball valve 10 is shown in plan view from the side. One of possible multiple apertures 20 located on this side of ball valve 10. One possible aperture is on the bottom and one possible aperture opposite side of the ball valve 10. A minimum of One or more of these aperatures can exist on. Additional aperatures are used to minimize connection fittings. As further displayed, the two oppositely located apertures 18 are located at a point higher on the ball valve 10.

Figure 3:
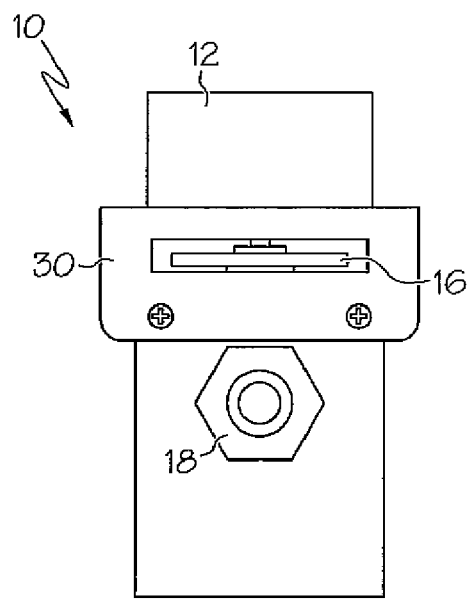
FIG. 3 shows a plan view of the ball valve from the back side.

With reference to FIG. 3, a plan view of the ball valve 10 is shown from the back side. The motor 12 is shown mounted onto the motor bracket 30. There is a square aperture 32 in the side of the motor bracket 30 through which the ball position wheel 16 slightly extends.

Figure 4:
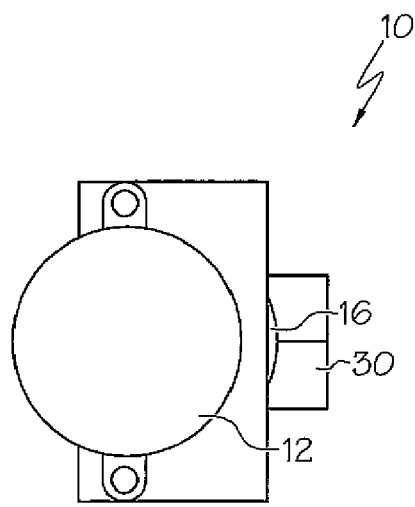
FIG. 4 shows a top plan view of the ball valve.

With reference to FIG. 4, a top plan view of the ball valve 10 is shown. As shown, the ball position wheel 16 exits the motor bracket 30 slightly.

Figure 5:
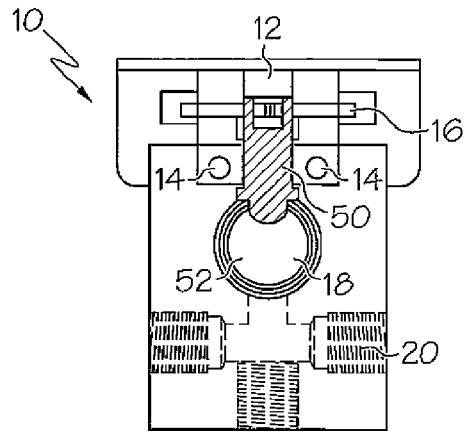
FIG. 5 shows a cross section view of a ball valve as taken from the front.

With reference to FIG. 5, a cross section view of the ball valve 10 as taken from the front is shown. As shown, the motor 12 is connected to a stem 50. The stem 50 sits atop the ball 13 and controls the direction of the ball 13. As shown, the ball 13 is located within the channel 52.

Figure 6:
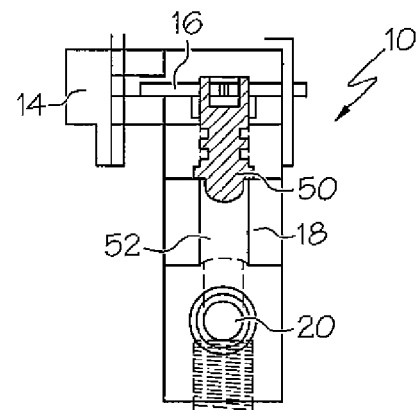
FIG. 6 shows a cross section view of a ball valve as taken from the side.

With reference to FIG. 6, a cross section view of the ball valve 10 as taken from the side is shown.

Figure 7:
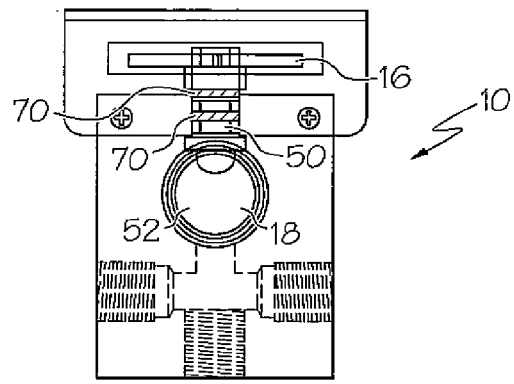
FIG. 7 shows a cross section view of a ball valve as taken from the back.
Figure 8:
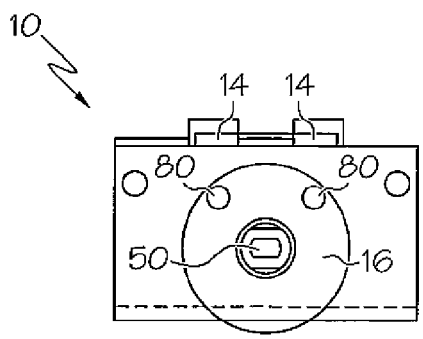
FIG. 8 shows a cross section view of a ball valve as taken from the top.

With reference to FIG. 7, a cross section view of the ball valve 10 as taken from the back is shown. As shown, the stem 50 has one or two O ring seals 70 around its circumference. With reference to FIG. 8, a cross section view of the ball valve 10 as taken from the top is shown. As shown, the ball position wheel 16 is secured around the stem 50. The position of the ball position wheel 16 is determined by shining the optical sensors 14 through the pair of sensor holes 80 located on the wheel 16.

Figure 9:
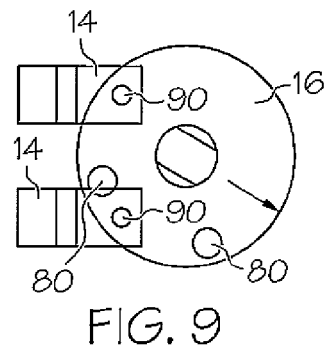
FIG. 9 shows an isolated view of the optical sensor and ball position wheel.

With reference to FIG. 9, an isolated view of the optical sensor 14 and ball position wheel 16 is shown. As shown, the optical sensor 14 has a pair of optical sensor lights 90 which are spaced equally as the sensor holes 80 located on the ball position wheel 16. The ball position wheel 16 will be rotated by the motor 12 until one or both optical sensor lights 90 are aligned with one or both sensor holes 80 on the ball position wheel 16.

Figure 10:
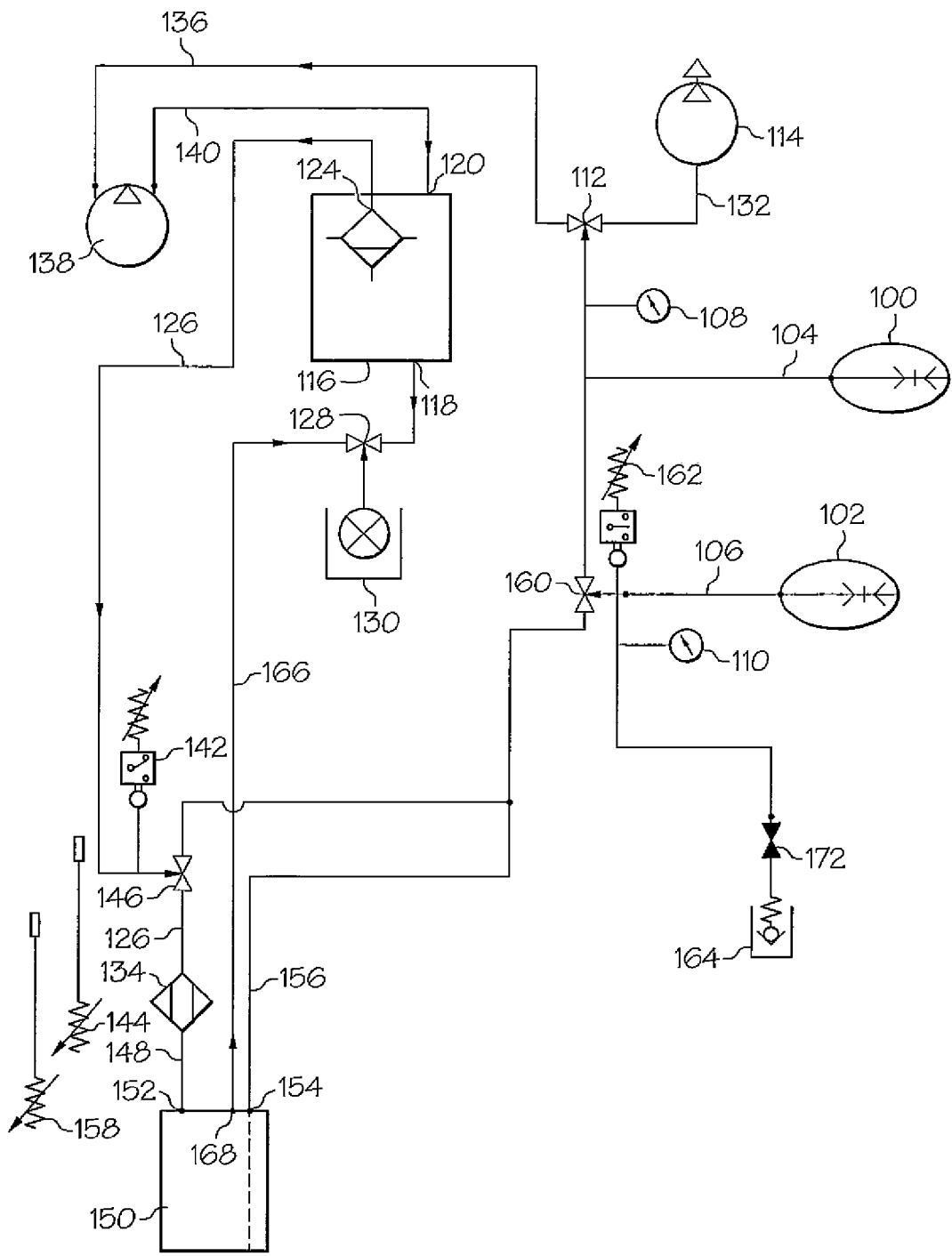
FIG. 10 shows a block diagram of the R/R/R Equipment which comprises the subject matter of this application.
Figure 11A:
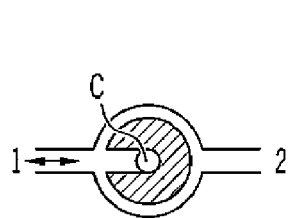
FIGS. 11a-13d show an enlarged view of a three way ball valve in its different forms and positions.
Figure 12A:
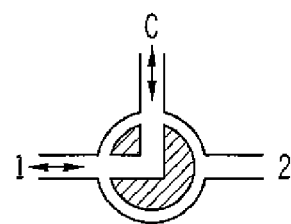
Figure 13A:
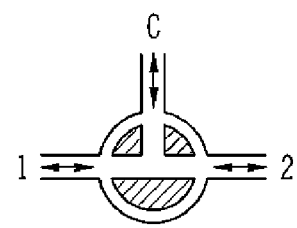
Figure 11B:
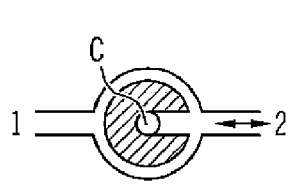
Figure 12B:
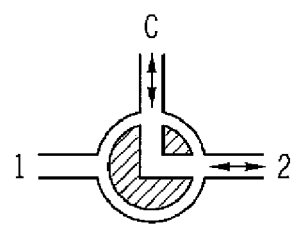
Figure 13B:
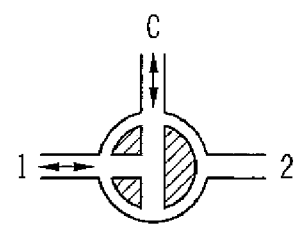
Figure 11C:
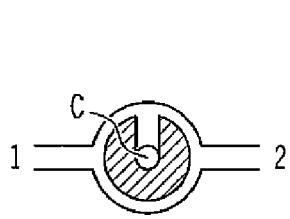
Figure 12C:
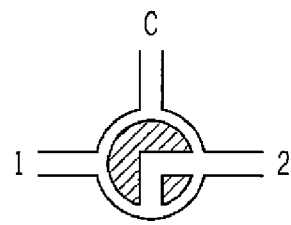
Figure 13C:
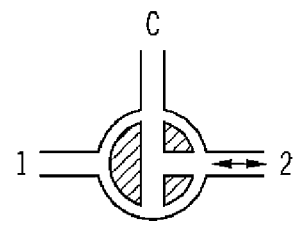
Figure 11D:
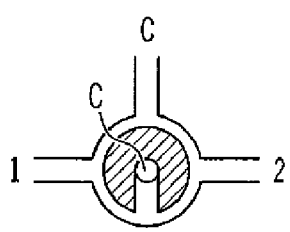
Figure 12D:
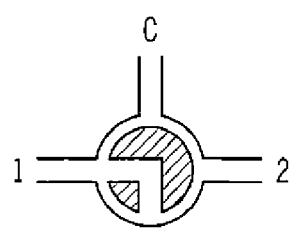
Figure 13D:
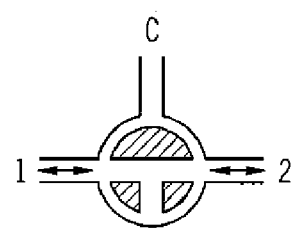

With reference to FIG. 10, a block diagram of the R/R/R Equipment which comprises the subject matter of this application is shown. As shown, a low side service hose snap coupling 100 and a high side service hose snap coupling 102 extend outwardly from the R/R/R Equipment. The low side service hose snap coupling 100 and the high side service hose snap coupling 102 connect to the R/R/R Equipment through service hoses 104, 106. The service hose snap couplings 100, 102 connect to an external air conditioning device in order to recycle and recharge the refrigerant. The low side service hose 104 is equipped with a low side pressure gauge 108 and the high side service hose 106 is equipped with a high side pressure gauge 110. The R/R/R Equipment contains a vacuum pump 114 which is connected to a vacuum pump hose 132. A motorized automatic ball valve 112 controls flow between the low side service hose 104 and the vacuum pump 114. This ball valve 112 is a three way valve. The ball valve 112 also controls flow into the compressor 138. The compressor suction hose 136 connects to a compressor 138. The compressor 138 compresses the refrigerant before it exits the compressor 138 through the compressor discharge hose 140 to an oil separation chamber 116. The refrigerant enters the oil separation chamber 116 through an inlet port 120 and exits though an outlet port 124. The separated oil is drained out of the oil separation chamber 116 through a drain port 118 into a drain bottle 130. A motorized automatic ball valve 128 controls flow between the oil separation chamber 116 and the oil drain bottle 130. This ball valve 128 is a three way valve. When the R/R/R cycle is complete, a user may remove the drain bottle 130 and empty the separated oil. The ball valve 128 is also used to purge Non-Condensable Gases (NCGs) from the storage tank 150. This ball valve 128 controls the flow of pressurized gases through a port 168 and hose 166 from the storage tank 150. The purged NCGs flows from the ball valve 128 into the drain bottle 130.

A discharge hose 126 is connected between the outlet port 124 of the oil drain separator 116 and the automatic motorized ball valve 146. This ball valve 146 controls the flow through hose 126 to moisture filter drier 134 which removes moisture from the refrigerant flow. The automatic motorized ball valve 146 can also bypass flow to port 154 of the storage tank 150. The dry refrigerant flow exits the moisture filter drier 134 through a hose 148. The hose 148 connects between compressor 138 and vapor port 152 of the storage tank 150.

A tank liquid hose 156 is connected to the liquid port 154. The tank liquid hose 156 transports the refrigerant back towards the high side service hose 102. A motorized automatic three way ball valve 160 controls the flow of refrigerant between the storage tank 150 and the high side service hose 102.

In addition, the R/R/R Equipment may have a discharge line temperature thermistor 144 and an ambient temperature thermistor 158 used to determine NCG purging algorithms. The R/R/R Equipment may have high pressure safety cutout switch 142 and pressure transducer 162 on monitoring compressor and vacuum pump conditions.

Oil re-injection is done by placing oil in oil injection bottle 164 and using the negative pressure differential created during the vacuum pump mode. The oil will flow from oil injection bottle 164

With reference to FIGS. 11a-11d and 12a-12d, an enlarged view of a three way "L-shaped" ball valve 112, 128, 146, 160 is shown in different positions. FIGS. 11a-11d, 12a-12d and 13a-13d are shown with the common port "C" with a perpendicular perspective to ports "1" and "2". FIGS. 12a-12d are also representative of an "L shaped" ball valve but shown in a different planar view from FIGS. 11a-11d. FIGS. 13a-13d represents a "T shaped" valve. It is contemplated that the L-shaped valve and T-shaped valves may be used with the R/R/R process. These ball valves 112, 128, 146, 160 are turned to different positions by an electromechanical motor 12. The position is exacted by the two optical sensors 14.

The automatic ball valves 112, 128, 146, 160 aid in the performance of three distinct functions in the R/R/R process: recovery, vacuum, and charge. In the recovery operation, two automatic ball valves 112, 160 are used to control the incoming flow of refrigerant to the compressor 138 and automatic ball valve 146 is used to control the discharge flow from the compressor 138. Automatic ball valve 160 is used to connect the high side service hose 106 to the low side service hose 104. Automatic ball valve 112 directs the refrigerant flow to the compressor 138. Automatic ball valve 146 opens just before the compressor 138 is started. Both automatic ball valves 112, 160 remain closed until the compressor 138 is started. Once started, both automatic ball valves 112, 160 are opened allowing the incoming refrigerant to flow to the compressor 138. The compressor 138 then compresses the refrigerant vapor into a storage vessel 150. The compressed refrigerant passes through several filtration devices on its journey to the storage vessel 150. The R/R/R Equipment continues to be operated until the pressure in the service hoses 104, 106 decreases into a slight negative pressure. Once desired negative pressure is achieved and recorded by the pressure transducer 162, the automatic ball valves 112, 160, 146 close and the compressor 138 shuts off.

In the vacuum operation, two automatic ball valves 160, 112 are used to control the vacuum flow to the vacuum pump 114. Automatic ball valve 160 is used to connect the high side service hose 106 to the low side service hose 104. The other automatic ball valve 112 directs the vacuum flow to the vacuum pump 114. The automatic ball valves 112, 160 remain closed until the vacuum pump 114 is started. Once the vacuum pump 114 is started, both automatic ball valves 112, 160 are opened allowing the vacuum flow to be applied to both the high 106 and low 104 side service hoses. The vacuum operation will continue until the desired amount of time has expired.

In the charge operation, automatic ball valve 160 controls the refrigerant flow. The automatic ball valve 160 is opened allowing liquid refrigerant from the storage tank 150 to flow out of the high side service hose 106 and into the air conditioning device. Once the desired amount of refrigerant is dispensed, the automatic ball valve 160 is closed.

It is further contemplated that a separate battery provides a backup power source to the automatic ball valves. A typical solenoid valve uses a physical return spring on the plunger to stop flow of refrigerant in situations where power is removed from the electrical coil. A similar function is necessary with the use of ball valves in case of a power interruption or failure. Thus, if the primary power source were to fail, the battery would provide enough power to immediately close all of the automatic ball valves and stop flow.

R/R/R Equipment with automatic ball valves operated by electromechanical controls. Said ball valves wipe themselves clean every time they open and close. The shearing action of the ball against the Teflon seals during the action of opening and closing prevents hardened sealant from making it inoperable. Due to the ball valve construction, contaminates and particles which affect solenoid valves do not affect the effectiveness of the ball valve.

Due to a ball valve's large porting, an increase in refrigerant flow will be achieved in both recovery and evacuation. Testing has proven that the use of ball valves instead of solenoid valves can reduce vacuum time by 50% to achieve the same vacuum level or performance. Thus, smaller vacuum pumps can be used in conjunction with ball valves to get the same performance as a larger vacuum pump used in conjunction with a solenoid valve. This may lead to a reduction in material cost and energy usage.

Testing has proven that the use of ball valves instead of solenoid valves can reduce recovery time by 30%. Typical recovery time through a solenoid valve on an automobile air conditioning system takes about 12 to 14 minutes. Tests run have proven that the same process run with ball valves can be completed in 8 to 10 minutes. Thus, smaller compressors could be used in conjunction with ball valves to get the same performance as a larger compressor used in conjunction with a solenoid valve. This may lead to a reduction in material cost and energy usage.

Testing has proven that the use of ball valves instead of solenoid valves can reduce charge time by 30%. Typical charge time through a solenoid valve on an automobile air conditioning system takes about 1.5 minutes. Tests run have proven that the same process run with ball valves can be completed in 1 minute.

The instant invention has been shown and described herein in what is considered to be the most practical and preferred embodiment. It is recognized, however, that departures may be made there from within the scope of the invention and that obvious modifications will occur to a person skilled in the art.

What is claimed is:

1. A device for automatic processing of contaminated refrigerant from an air conditioning system, said device comprising:
   a compressor for compressing refrigerant;
   a storage tank, said storage tank receiving and temporarily containing said compressed refrigerant;
   said storage tank including a vapor port and a liquid port;
   a vacuum pump for creating low pressure within said device during evacuation of refrigerant;
   a low pressure service hose for connecting said device to said air conditioning system;
   a high pressure service hose for connecting said device to said air conditioning system;
   at least one automatic electro-mechanically controlled multi-position ball valve;
   said automatic electro-mechanically controlled multi-position ball valve further including a position locator, said position locator determining the exact position of said automatic multi-position ball valve;
   said position locator including at least one optical sensing means having an optical sensor light and a sensor, and a rotating light interrupting wheel having at least one optical sensor position hole;
   said rotating light interrupting wheel disposed between said optical sensor light and said sensor;
   said position locator determining said exact position of said automatic multi-position ball valve when said sensor receives light from said optical sensor light through said position hole; and
   said at least one automatic electro-mechanically controlled multi-position ball valve controlling flow of said refrigerant through said device.

2. The device for automatic processing of contaminated refrigerant from an air conditioning system described in claim 1, further comprising:
   an oil separator, said oil separator receiving compressed refrigerant from said compressor; said oil separator further including means for draining oil separated from said compressed refrigerant;
   said storage tank receiving and temporarily containing said compressed refrigerant from said oil separator.

3. The device for automatic processing of contaminated refrigerant from an air conditioning system described in claim 2, further comprising:
   a plurality of automatic electro-mechanically controlled multi-position ball valves, said automatic electro-mechanically controlled multi-position ball valves selectively controlling refrigerant flow through said compressor, oil separator and storage tank.

4. The device for automatic processing of contaminated refrigerant from an air conditioning system described in claim 3, further comprising:
   a plurality of position locators, each said position locator determining the exact position of each said automatic electro-mechanically controlled multi-position ball valve.

5. The device for automatic processing of contaminated refrigerant from an air conditioning system described in claim 3, further comprising:
   a purge port in said storage tank;
   a first automatic electro-mechanically controlled multi-position ball valve, said first automatic electro-mechanically controlled multi-position ball valve controlling flow between said low pressure service hose, said vacuum pump, and said compressor; and
   a second automatic electro-mechanically controlled multi-position ball valve, said second automatic electro-mechanically controlled multi-position ball valve controlling flow between said oil separator means for draining and said storage tank purge port.

6. The device for automatic processing of contaminated refrigerant from an air conditioning system described in claim 5, further comprising:
   said oil separator having an outlet port;
   said storage tank having a liquid port;
   a third automatic electro-mechanically controlled multi-position ball valve, said third automatic electro-mechanically controlled multi-position ball valve controlling flow between said oil separator outlet port and said storage tank; and
   a fourth automatic electro-mechanically controlled multi-position ball valve, said fourth automatic electro-mechanically controlled multi-position ball valve controlling flow between said high pressure service hose and said storage tank liquid port.

7. The device for the automatic processing of contaminated refrigerant from an air conditioning system described in claim 3, wherein each said automatic electro-mechanically controlled multi-position ball valve is a three way valve.

8. The device for the automatic processing of contaminated refrigerant from an air conditioning system described in claim 3, wherein each said automatic electro-mechanically controlled multi-position ball valve is opened and closed by an electro-mechanical motor powered by a power source.

9. The device for automatic processing of contaminated refrigerant from an air conditioning system described in claim 1, wherein said position locator comprises at least two optical sensors and an equivalent number of optical sensor position holes in each said automatic electro-mechanically controlled multi-position ball valve.

10. The device for the automatic processing of contaminated refrigerant from an air conditioning system described in claim 8, wherein said electro-mechanical motor further comprises an emergency battery power source which will automatically close each ball valve in the event that said power source fails.

11. A device for automatic processing of contaminated refrigerant from an air conditioning system, said device comprising:
   a compressor for compressing refrigerant;
   a storage tank, said storage tank receiving and temporarily containing said compressed refrigerant;
   said storage tank including a vapor port, a purge port and a liquid port;
   a vacuum pump for creating low pressure within said device during evacuation of refrigerant;
   a low pressure service hose for connecting said device to said air conditioning system;
   a high pressure service hose for connecting said device to said air conditioning system;
   a first automatic electro-mechanically controlled multi-position ball valve, said first automatic electro-mechanically controlled multi-position ball valve controlling flow between said low pressure service hose, said vacuum pump, and said compressor;
   a second automatic electro-mechanically controlled multi-position ball valve, said second automatic electro-mechanically controlled multi-position ball valve controlling flow between said oil separator means for draining and said storage tank purge port;
   each said automatic electro-mechanically controlled multi-position ball valve further including a position locator, each said position locator determining the exact position of each said automatic multi-position ball valve; and
   each said position locator including at least one optical sensing means having an optical sensor light and a sensor, and a rotating light interrupting wheel having at least one optical sensor position hole;
   said rotating light interrupting wheel disposed between said optical sensor light and said sensor;
   each said position locator determining said exact position of said automatic multi-position ball valve when said sensor receives light from said optical sensor light through said position hole.

12. The device for automatic processing of contaminated refrigerant from an air conditioning system described in claim 11, further comprising:
   an oil separator, said oil separator receiving compressed refrigerant from said compressor; said oil separator further including means for draining oil separated from said compressed refrigerant;
   said storage tank receiving and temporarily containing said compressed refrigerant from said oil separator.

13. The device for automatic processing of contaminated refrigerant from an air conditioning system described in claim 12, further comprising:
   said oil separator having an outlet port;
   said storage tank having a liquid port;
   a third automatic electro-mechanically controlled multi-position ball valve, said third automatic electro-mechanically controlled multi-position ball valve controlling flow between said oil separator outlet port and said storage tank; and a fourth automatic electro-mechanically controlled multi-position ball valve, said fourth automatic electro-mechanically controlled multi-position ball valve controlling flow between said high pressure service hose and said storage tank liquid port.

14. The device for the automatic processing of contaminated refrigerant from an air conditioning system described in claim 13, wherein each said automatic electro-mechanically controlled multi-position ball valve is a three way valve.

15. The device for the automatic processing of contaminated refrigerant from an air conditioning system described in claim 14, wherein each said automatic electro-mechanically controlled multi-position ball valve is opened and closed by an electro-mechanical motor powered by a power source.

16. The device for automatic processing of contaminated refrigerant from an air conditioning system described in claim 12, wherein said position locator comprises at least two optical sensors and an equivalent number of optical sensor position holes in each said automatic electro-mechanically controlled multi-position ball valve.

17. The device for the automatic processing of contaminated refrigerant from an air conditioning system described in claim 15, wherein said electro-mechanical motor further comprises an emergency battery power source which will automatically close each ball valve in the event that said power source fails.

18. A device for automatic processing of contaminated refrigerant from an air conditioning system, said device comprising:
   a compressor for compressing refrigerant;
   an oil separator, said oil separator receiving compressed refrigerant from said compressor; said oil separator further including means for draining oil separated from said compressed refrigerant;
   said oil separator having an outlet port;
   a storage tank, said storage tank receiving and temporarily containing said compressed refrigerant from said oil separator;
   said storage tank including a vapor port, a purge port and a liquid port;
   a vacuum pump for creating low pressure within said device during evacuation of refrigerant;
   a low pressure service hose for connecting said device to said air conditioning system;
   a high pressure service hose for connecting said device to said air conditioning system;
   a first automatic electro-mechanically controlled multi-position ball valve, said first automatic electro-mechanically controlled multi-position ball valve controlling flow between said low pressure service hose, said vacuum pump, and said compressor;
   a second automatic electro-mechanically controlled multi-position ball valve, said second automatic electro-mechanically controlled multi-position ball valve controlling flow between said oil separator means for draining and said storage tank purge port;
   a third automatic electro-mechanically controlled multi-position ball valve, said third automatic electro-mechanically controlled multi-position ball valve controlling flow between said oil separator outlet port and said storage tank; and
   a fourth automatic electro-mechanically controlled multi-position ball valve, said fourth automatic electro-mechanically controlled multi-position ball valve controlling flow between said high pressure service hose and said storage tank liquid port;

wherein each said automatic electro-mechanically controlled multi-position ball valve is opened and closed by an electro-mechanical motor powered by a power source;

wherein each said automatic electro-mechanically controlled multi-position ball valve includes a position locator;

Wherein each of said position locators comprises at least two optical sensing means, each optical sensing means having an optical sensor light and a sensor, each of said position locators further comprising a rotating light interrupting wheel having a number of optical sensor position holes equal to the number of optical sensing means in the position locator containing the rotating light interrupting wheel;

Said rotating light interrupting wheel being disposed between the optical sensor lights and the sensor of the position locator the light interrupting wheel is part of;

Wherein said position locators determine the exact position of each said automatic electro-mechanically controlled multi-position ball valve when each of said sensors receives light from said optical sensor lights through said position holes; and an emergency battery power source which will automatically close each ball valve in the event that said power source fails.

19. The device for the automatic processing of contaminated refrigerant from an air conditioning system described in claim 18, wherein each said automatic electro-mechanically controlled multi-position ball valve is a three way valve.

20. The device for automatic processing of contaminated refrigerant from an air conditioning system described in claim 1, said position locator including at least two sensing means each having an optical sensor light and a sensor, said rotating light interrupting wheel having at least two optical sensor position holes; said rotating light interrupting wheel disposed between each of said optical sensor lights and said sensors; said position locator determining said exact position of said automatic multi-position ball valve when at least one of said sensors receives light from said optical sensor lights through said position holes.

21. The device for automatic processing of contaminated refrigerant from an air conditioning system described in claim 11, each said position locator including at least two sensing means each having an optical sensor light and a sensor, and said rotating light interrupting wheels being disposed between each of said optical sensor lights and said sensors for each position locator; each said position locator determining said exact position of said automatic multi-position ball valve when at least one sensor within the position locator receives light from said optical sensor lights through said position holes.

* * * * *